UNITED STATES PATENT OFFICE.

HANS GOLDSCHMIDT AND WALTER BREWITT, OF ESSEN-ON-THE-RUHR, GERMANY, ASSIGNORS TO GOLDSCHMIDT THERMIT COMPANY, OF NEW YORK, N. Y., A CORPORATION OF NEW YORK.

PROCESS OF UNITING RAILS.

1,246,909.     Specification of Letters Patent.     Patented Nov. 20, 1917.

No Drawing.     Application filed June 14, 1912. Serial No. 703,699.

*To all whom it may concern:*

Be it known that we, HANS GOLDSCHMIDT and WALTER BREWITT, subjects of the King of Prussia, and residents of Essen-on-the-Ruhr, in the Province of the Rhine, German Empire, have jointly invented certain new and useful Improvements in the Process for Uniting Rails and the like, of which the following is an exact specification.

The present invention relates to a method of joining rails, especially tramway rails, girders and other pieces of metal in which the weld or joint is wholly or partially produced without any flux by means of a metal or an alloy, preferably free of carbon, the object of such welding being to produce a joint which is quite solid and in which no spaces or cavities are found. The present improved process possesses many advantages compared with the direct welding of parts as originally performed by the aluminothermic welding process. When hard steel rails are directly welded, the weld or joint becomes very brittle and is therefore easily affected by the jolting of the wheels of rolling stock passing over the same. Irregular or non-uniform cooling and contraction of the parts at the joint owing to the dissymmetrical or non-uniform distribution of the mass produces varying tensions at the different points of the cross section. With hard metal, these tensions cannot be reduced to uniformity. If, however, a lamina or layer of a highly tensile metal is inserted into the joint by welding, the dangerous varying tensions aforesaid are brought to uniformity and the welded joint becomes elastic, the breaking strain being considerably increased. Furthermore, it has been found that in this new method of uniting metal pieces, and in the case of uniting rail ends more especially, pressing, or forcing of the rails together, by mechanical means, is not necessary. This advantage considerably reduces the cost of the work, avoids the use of a special clamping or pressing apparatus, and moreover renders superfluous the machining or working of the surfaces at the joint or at least reduces such work, because it is no longer necessary to remove from the rail tread a seam or pad which was usually formed heretofore by pressing the hot rail ends one toward the other. As the upsetting of the meeting rail ends is completely avoided the disadvantage due to the deformation of the rails by such upsetting is obviated.

In order to completely weld or unite adjoining faces of rails by the aluminothermic process it was necessary heretofore to use a clamping device by means of which the rails were forced together, thus moving the rails over a distance of, perhaps, a few millimeters. Consequently it was practically impossible to weld the entire faces of opposed rail ends in those cases where the rails were laid in a paved road surface. In such cases only the foot and web portions could be united, whereas the head portions were not united or welded, even although the gap between the head portions was filled with an iron sheet under pressure. The safe stress of a rail welded in such a manner is never so high as the safe stress of a rail welded throughout its whole cross sectional area, so that there is a proper metallic joint at the head as well as at the foot and web. A welded joint in which the head portions are not welded, is only suitable under definite conditions and cannot be satisfactory in all countries.

Another aluminothermic process for welding the whole cross section of rails lying in a paved surface without employing a clamp device, consists in fully filling up the space between the rails with the liquid iron of the aluminothermic process in such a manner that the rail ends are joined from the base of the foot to the crown of the head. In both cases, that is to say, when a clamp device is used or when the welding is performed by filling up the space with iron as stated, subsequent machining or treatment of the tread surfaces and heads of the rails is absolutely necessary. In the first case the bulge or excrescence at the joint must be removed and in the second case the excrescence unavoidably formed by filling up the space to overflowing must be removed.

According to this invention, in order to uniformly join the rail ends from the sole to the crown, the process is carried out as follows:

A layer of metal free of carbon, for example a copper or bronze sheet, is inserted into the space between the two rail ends which are immovably held in position. Care is to be taken that the contact surfaces of the rail ends and of the intermediate metals are mechanically cleaned, so that they have metallic brightness and are evenly dressed in order that a close contact may be secured. Now a casting according to an aluminothermic process is carried out around the joint. The quantity of the aluminothermic mixture must be such that the surface of the intermediate metal lamina or sheet will become sufficiently soft in order to solidly join with the rail sections, and leave no crevices or hollows. This effect is realized by the pressure produced by the elongation of the immovably held rail-ends due to expansion under the action of heat. The casting may be effected in a double manner as previously known. If the molten iron resulting from the aluminothermic process is poured out over the rim of the crucible into a mold surrounding the joint, a uniform union over the whole cross sectional area results. The outer casting which is composed of corundum slag inclosing the aluminogenetic iron may be knocked off when cool.

If the casting is produced by running metal out of a funnel shaped crucible, the iron resulting from the aluminothermic process which first flows into the mold homogeneously welds or fuses the lower part of the rails, whereas the slag heats the upper part in such a manner that a metallic union over the whole cross sectional area is produced in accordance with the present invention. In this case the intermediate metal piece is only inserted between the upper parts of the rail sections namely the head and web portions because on the foot of the rail section a direct fusion takes place. If the rails are joined according to the present process, the safe stress of the rails will be from 50 to 60 kg. per square millimeter over the whole sectional area. If however the welding is carried out according to the former aluminothermic welding process, by which only the rail base and part of the web are welded by fusing them together by means of the alumino-thermic iron, the latter forming a sort of fish plate, only the sectional area formed of the base and web and of the fish plate itself has a safe stress of 50 to 60 kgs., and the safe stress of the whole sectional area of the rail is greatly inferior owing to the fact that a perfect union in the rail head is not accomplished. There is not produced an excrescence upon the head of the rail at the joint which would have to be removed. The joint throughout the whole section shows a strong metallic structure and therefore the present improvements provide a rail-joint which is capable of being universally applied and which is independent of climatic conditions and variations.

The heating of the rail-ends may be carried out in another manner in performing the present process. For example instead of employing the aluminothermic mixture as described, hot gases may be employed, the effect of which is increased in a known manner, for example by means of a mold surrounding the weld, through which mold the hot gases are blown. Or electrical heating may be employed as for example electrical heaters of the resistance type.

Instead of copper, other metals free of carbon may be used, for example, silver or nickel. Furthermore, a copper-plated or nickel-plated iron sheet may be employed which can easily be inserted into the joint if rails are used which are laid in a paved surface. Sometimes a metallic web or net, or metal fabric may be used as the intermediate layer, as for example, when rails are to be welded which are fixed only shortly before welding.

It is not always necessary to heat the intermediate metals so highly that they become quite molten or fluid. To bring them to welding heat is in many cases sufficient for producing a good metallic connection between the iron surfaces.

The present process is not only applicable for the welding of surfaces shaped truly at right angles to the length of the bodies to be united but it is also applicable for the uniting of rails the ends of which are beveled or scarfed. Also the parts to be joined may be fitted together with male and female joints. Furthermore, it is possible to join rails having an over-lapping joint, as for example where half the thickness of each rail is removed. In such a case the longitudinal meeting faces as well as the transverse meeting faces may be joined. Primarily however the present improvements are intended for uniting the ordinary butt joint throughout its cross sectional area.

Naturally it is possible to unite in this manner girders and rails not built into position or permanently laid provided they are fixed so as to be immovable during the process.

The aluminothermic mixture hereinbefore referred to may be composed of a metal oxid not only in connection with aluminium, but also with similarly acting metals or alloys as for example calcium-silicon, silicon-magnesium, aluminium-calcium and so on.

What I claim is:

1. The method of uniting immovably-held rails and the like, which consists in inserting between the end surfaces to be united an intermediate layer of metal and heating the immovable rail ends together with the intermediate metal to welding temperature, the intermediate layer of metal and the rail ends being so shaped as to cause the expansion of the rail ends to produce sufficient pressure on the intermediate layer of metal to effect a uniform weld.

2. The method of uniting immovably-held rails and the like, which consists in inserting between the end surfaces to be united an intermediate layer of metal free of carbon and heating the immovable rail ends together with the intermediate metal to welding temperature, the intermediate layer of metal and the rail ends being so shaped as to cause the expansion of the rail ends to produce sufficient pressure on the intermediate layer of metal to effect a uniform weld.

3. A method of uniting immovably-held rails and the like, which consists in inserting an intermediate layer of metal free of carbon between the end surfaces to be united and heating the welding zone by means of an alumino-thermic process to welding temperature, the intermediate layer of metal and the rail ends being so shaped as to cause the expansion of the rail ends to produce sufficient pressure to effect a uniform weld.

4. A method of uniting immovably-held rails and the like, which consists in inserting a piece of copper free of carbon between the end surfaces to be united and heating the welding zone to welding temperature, said piece of copper and the rail ends being so shaped as to cause the expansion of the rail ends to produce sufficient pressure to effect a uniform weld.

5. A method of uniting immovably-held railway rails, which consists in inserting between the end surfaces to be united an intermediate layer of highly tensile metal and heating the immovable rail ends together with the intermediate metal to welding temperature, said intermediate layer of metal and the rail ends being so shaped that the expansion of the rail ends produces sufficient pressure to effect a uniform weld.

In witness whereof we have hereunto set our hands in the presence of two witnesses.

HANS GOLDSCHMIDT. [L. S.]
WALTER BREWITT. [L. S.]

Witnesses for Dr. Hans Goldschmidt:
 HAROLD B. ATKINS,
 WM. C. CUNTZ.

Witnesses for Walter Brewitt:
 HELEN NUFER,
 ALBERT NUFER.